United States Patent

Nollace

[15] 3,694,732

[45] Sept. 26, 1972

[54] INVERTER PROVIDING A VARIABLE OUTPUT VOLTAGE

[72] Inventor: Pierre Nollace, Lamanon, France

[73] Assignee: Compagnie Generale D'Electronique Industrielle Lepaute, Paris, France

[22] Filed: Sept. 22, 1970

[21] Appl. No.: 74,343

[30] Foreign Application Priority Data

Sept. 23, 1969 France......................6932445

[52] U.S. Cl..............................................321/45 R
[51] Int. Cl. ..............................................H02m 7/48
[58] Field of Search..........................321/9 A, 18, 45

[56] References Cited

UNITED STATES PATENTS

| 3,378,751 | 4/1968 | Walker | 321/18 |
| 3,461,373 | 8/1969 | Mokrytzki | 321/9 A |

*Primary Examiner*—William M. Shoop, Jr.
*Attorney*—Sughrue, Rothwell, Mion, Zinn & Macpeak

[57] ABSTRACT

An inverter circuit for supplying an AC output from a DC input. The circuit comprises a bridge circuit including four controlled diodes, one in each leg of the bridge. The diodes are fired by a control circuit in such a manner that an AC output is supplied to a load connected across a diagonal of the bridge.

6 Claims, 6 Drawing Figures

INVERTER PROVIDING A VARIABLE OUTPUT VOLTAGE

The present invention concerns an inverter comprising two pairs of controlled rectifiers connected in a bridge circuit with an input across a first bridge diagonal for connection to a direct current supply and an output across the second bridge diagonal for connection to an alternating current load, the output voltage of the inverter being variable.

The controlled rectifiers of one pair have their anodes connected to a positive terminal of the input and the controlled rectifiers of the other pair have their cathodes connected to a negative terminal. Thus the inverter consists of a series-connected combination of rectifiers connected on each side of the load.

Systems for varying the output voltage of an inverter have been proposed in which the firing times of the controlled rectifiers of the inverter are varied. In these systems, each controlled rectifier is rendered conductive during a half period of the output and the regulation of the output voltage is obtained by varying the phasing of the control signals applied to the controlled rectifiers of one series-connected combination in relation to the control signals applied to the other combination.

In such an arrangement, the reference potential of the alternating circuit is sometimes that of the positive supply terminal and sometimes that of the negative. Thus it is not possible to obtain a "cold point" common to the power circuit and the control circuit, that is, a point whose potential may serve as a reference for the two circuits. It is very advantageous, however, in this type of equipment, to provide such a reference point allowing, for example, the two parts of the equipment to be connected to a common return, such as a ground connection.

In accordance with this invention, an inverter comprises two pairs of controlled rectifiers connected in a bridge circuit with an input across a first bridge diagonal for connection to a direct current supply and an output across the second bridge diagonal for connection to an alternating current load. The controlled rectifiers of one pair have their anodes connected to a positive terminal of the input and the controlled rectifiers of the other pair have their cathodes connected to a negative terminal of the input. The output voltage of an inverter is varied by controlling the firing times of the controlled rectifiers, the rectifiers of a first pair being maintained continuously in conduction except during periods at which power is to be supplied to the inverter output, at which point one of the conducting rectifiers is extinguished and the rectifier of the second pair in series with it is fired.

In this way, the reference potential of the alternating voltage provided is equal to the potential of the direct current supply since the pair of controlled rectifiers are maintained continuously in conduction except during those periods at which power is to be supplied to the inverter output.

The inverter preferably includes a control circuit for the controlled rectifiers arranged to provide a first train of pulses at twice the inverter output frequency and a second train of pulses delayed with respect to the first train by an amount dependent on the alternating output voltage of the inverter. The pulses of the first train extinguish one of the continuously conducting rectifiers of the first pair and fire the rectifier of the second pair in series with it. The pulses of the second train reverse this action by refiring the extinguished rectifier and extinguishing the fired rectifier.

Alternatively, the inverter may include a control circuit for the controlled rectifiers arranged to provide first and second train of pulses with periods equal to that of the alternating inverter output voltage. The leading edge of a pulse will extinguish one of the continuously conducting rectifiers of the first pair and fire the rectifier of the second pair in series with it. The end of the pulse will reverse this action by refiring the extinguished rectifier and extinguishing the fired rectifier.

The invention will now be described in more detail, by way of examples only and with reference to the accompanying diagrammatic drawings, in which.

Figure 1:
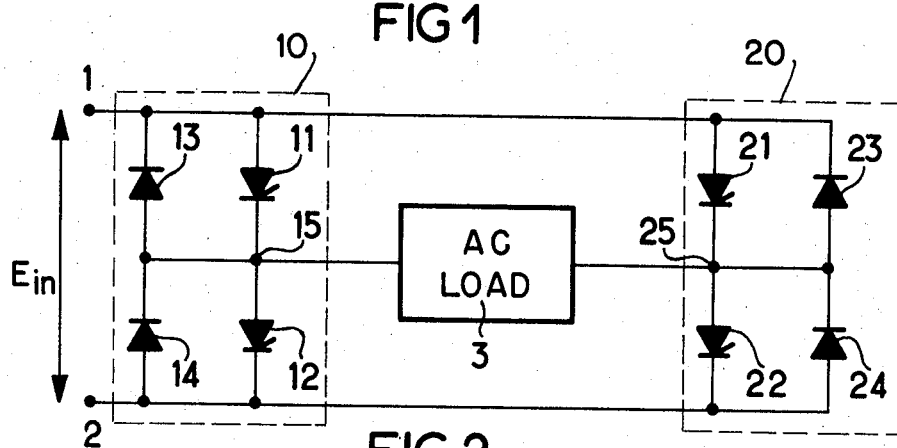
FIG. 1 is a schematic diagram of the preferred embodiment of an inverter.

Referring to FIG. 1, the inverter is shown in a simplified form, and only the four controlled rectifiers 11, 12, 21 and 22 are shown. The four controlled rectifiers are connected in a bridge circuit with an input across a first bridge diagonal for connection to a direct current supply and an output across the second bridge diagonal for connection to an alternating current load. One pair of controlled rectifiers 11 and 21 have their anodes connected to a positive terminal 1 of the input and the other pair of controlled rectifiers 12 and 22 have their cathodes connected to a negative terminal 2 of the input. The direct input voltage is indicated at $E_{in}$. The alternating current load is shown at 3 connected between points 15 and 25. Also connected to 15 and 25 are the cathodes of rectifiers 11 and 21 and anode of rectifiers 12 and 22. Diodes 13, 14, 21 and 22 are connected in anode-cathode parallel relationship with the rectifiers 11, 12, 21 and 22, respectively, to provide return paths.

In FIG. 1, other controlled rectifiers or equivalent switching circuits connected to the control gates of the controlled rectifiers 11, 12, 21 and 22 have not been shown, for the sake of simplicity in the diagram. Each pair of controlled rectifiers 11, 12, and 21, 22 provides a series-connected combination, each connected to one side of the load 3. Filter circuitry (not shown) is also connected between the points 15 and 25.

Figure 2:
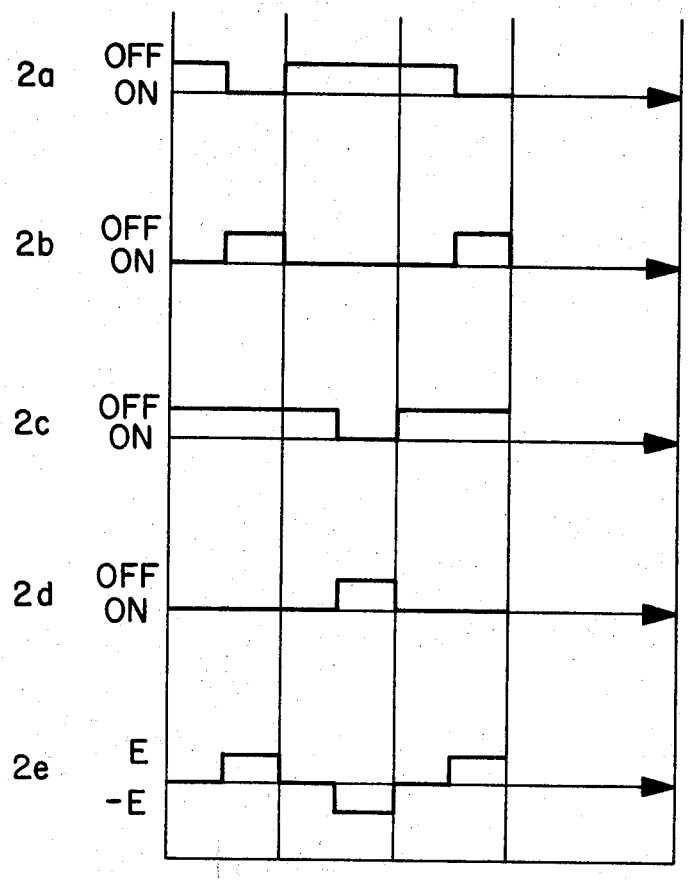
FIG. 2 is a waveform diagram referred to in the explanation of the operation of the circuit of FIG. 1.

In FIG. 2, the waveforms 2a to 2d show how the states of the respective controlled rectifiers 11, 12, 21 and 22 vary with time, and waveform 2e shows the voltage obtained between points 15 and 25. In waveforms 2a to 2d, the curve coincides with the axis of time when the corresponding controlled rectifier is conducting. When a rectifier is cut-off or extinguished, the corresponding curve consists of a straight line parallel to the time axis and spaced therefrom. The de-ionization periods have not been shown in this diagram.

It is seen from FIG. 2 that in the rest periods, that is to say those times when no voltage is obtained between points 15 and 25, the controlled rectifiers of the first pair, rectifiers 12 and 22 in the present example, are maintained continuously in conduction. During those periods at which power is to be supplied to the inverter output, one of these conducting rectifiers is extinguished and the rectifier of the second pair in series with it is fired. Thus, for example, in the first vertical column of FIG. 2, rectifiers 12 and 22 are initially conducting. Rectifier 12 is then extinguished and simultaneously rectifier 11 is switched into conduction. There is thus obtained between points 15 and 25 a direct voltage with positive polarity and of amplitude E.

When no voltage is obtained between points 15 and 25, the load is held at the potential of terminal 2 of the supply through the controlled rectifier pair maintained continuously in conduction except during those periods in which power is supplied to the inverter output. The potential at this point is fixed and thus provides a reference or "cold point" common to the power and control circuits.

Figure 3:
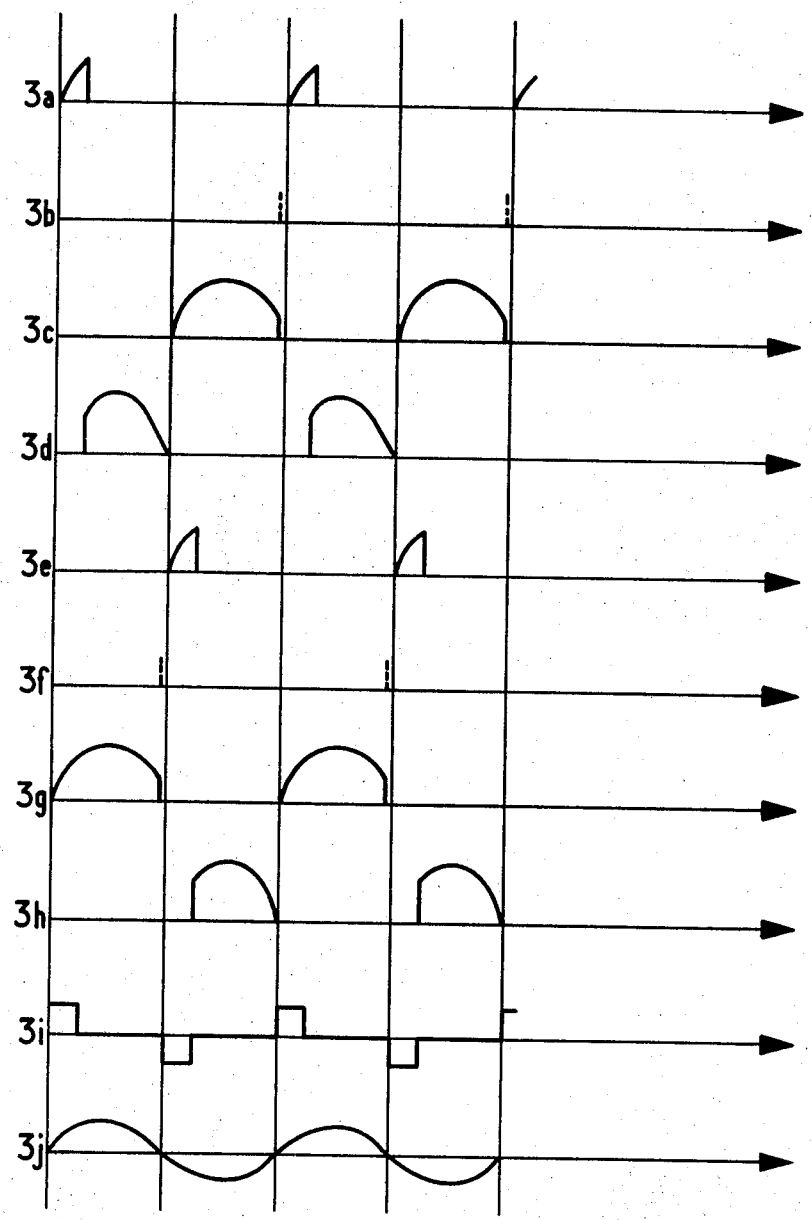
FIG. 3 shows waveforms at various points in the circuit of FIG. 1 on low load.
Figure 4:
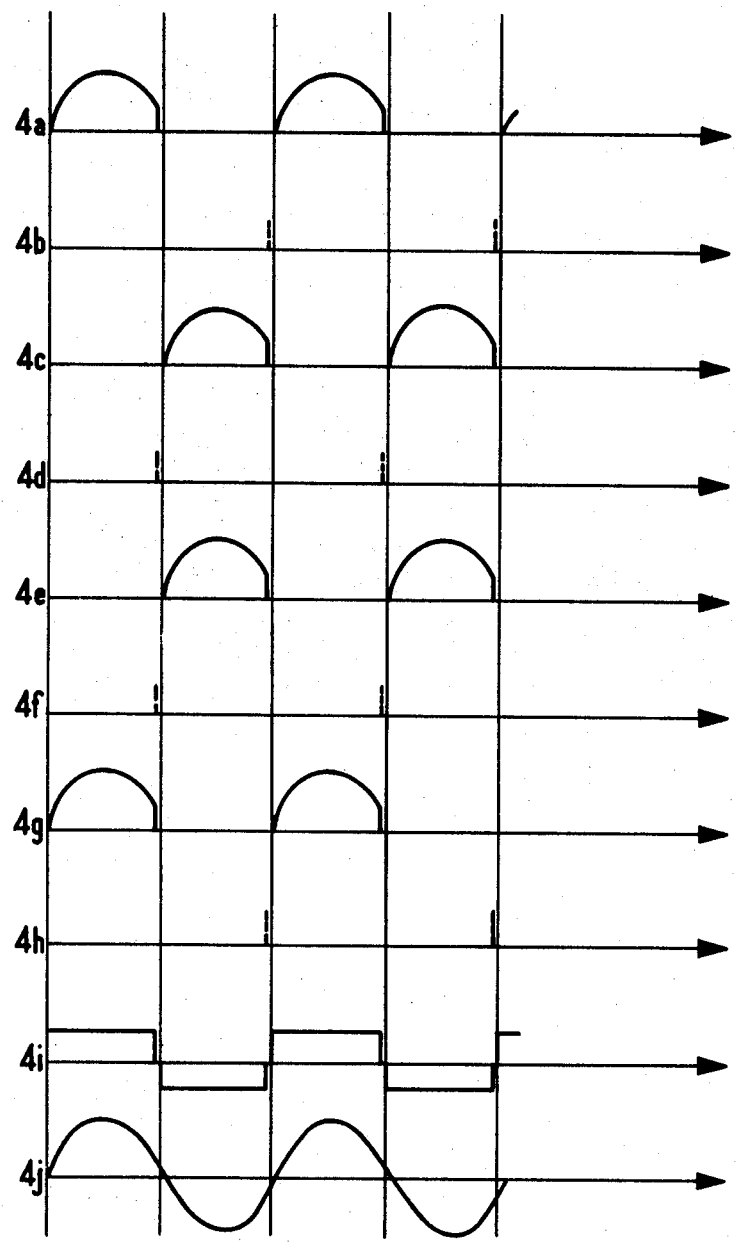
FIG. 4 shows waveforms at various points in the circuit of FIG. 1 on full load.

In FIGS. 3 and 4, corresponding respectively to low load and full load on the inverter, waveforms a to j correspond respectively to the current flowing through circuit elements 11, 13, 12, 14, 21, 23, 22, 24, the voltage obtained between points 15 and 25, and the current flowing through the load 3 after filtering and shaping, the load circuit being tuned to the output frequency of the inverter.

It is seen from FIGS. 3 and 4 that one advantage of the invention lies in the fact that the diodes 13 and 23 do not carry any current, with the possible exception of pulses during switching which are shown in dotted lines in the Figures. These two diodes may therefore have a smaller capacity than the diodes 14 and 24, thereby reducing the cost of the equipment.

Furthermore, when the load circuit is tuned to a frequency at least equal to the output frequency of the inverter, the controlled rectifiers 12 and 22 operate in natural extinction, that is, they cut off when the current flowing between points 15 and 25 passes through zero. Thus the cut-off or extinction energy of these two controlled rectifiers may be considerably reduced.

A further advantage of the invention is that the measurement of the reactive current, passing to the load during the period when the source is not supplying energy to the load, is greatly facilitated. This measurement may be accomplished by merely measuring the current through the protective diodes 14 and 24 which are connected to the pole of the source to which the load is connected during the periods of non-energization. The current may be measured through a common connecting wire linking the diodes to the poles.

A still further advantage is that the battery used to supply the voltage $E_{in}$ may be made smaller and two separate batteries may be used. This is accomplished by eliminating the connection between diodes 11 and 21 and connecting one source between terminals 1 and 2 and a second source between the anode of controlled rectifier 21 and the cathode of controlled rectifier 22. This is possible since terminal 2 is always the reference terminal when the load is not being energized. In prior art systems, since the reference terminal would switch between terminals 1 and 2, the use of two separate sources would not be possible.

Figure 5:
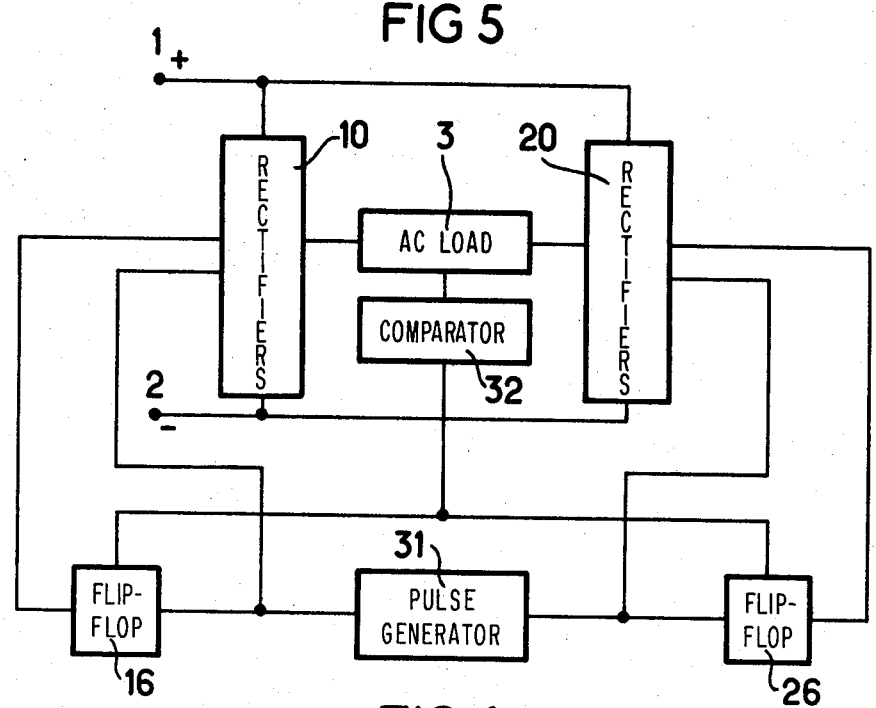
FIG. 5 shows a first form of control circuitry for the inverter.

Fig. 5 shows a first form of control circuitry for the controlled rectifiers, arranged to provide a first train of pulses at twice the inverter output frequency and a second train of pulses delayed with respect to the first train by an amount dependent on the alternating output voltage of the inverter. In the Figure, blocks 10 and 20 represent the two series-connected combinations of rectifiers on each side of the load 3, comprising respectively controlled rectifiers 11 and 12 with their diodes 13 and 14, and controlled rectifiers 21 and 22 with their diodes 23 and 24.

A generator circuit 31 provides two pulse trains with a relative delay of one half period of the output frequency of the inverter. The pulse trains are applied to respective circuits 16 and 26, including, for example, a monostable flip-flop forming a pulse which can be delayed with respect to the input pulse by a variable amount. The pulse trains from generator circuit 31 also are applied to the series-connected combinations 10 and 20, the pulse trains obtained from the left-hand output of circuit 31 cutting off the controlled rectifier 12 and firing controlled rectifier 11, and the pulse trains obtained from the right-hand output controlling the combination 20 in an analogous manner.

These pulses constitute the first train at twice the inverter output frequency. The second train of pulses delayed with respect to the first train by an amount dependent on the alternating output voltage of the inverter are the pulse trains provided by the respective flip-flops 16 and 26. These serve to reverse the action of the first train of pulses, to refire the extinguished rectifier of each combination and extinguish the fired rectifier. The delay is controlled by an output of a comparator circuit 32, which is connected to sample the voltage across the load 3, and arranged to compare this voltage with a reference potential. An output voltage of the comparator depending on the difference between the load voltage and the reference potential is applied to each flip-flop 16 and 26.

Figure 6:
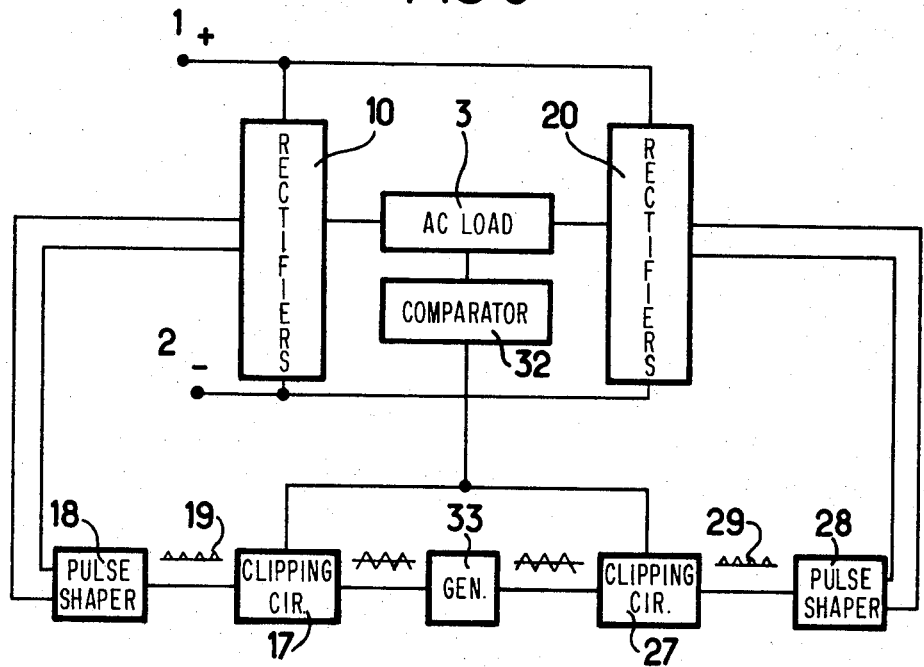
FIG. 6 shows a second form of control circuitry.

FIG. 6 shows a second form of control circuitry. A generator circuit 33 provides two triangular waveforms with a relative phase shift of one half period of the output frequency of the inverter. Each of these triangular waveform signals is clipped in a respective circuit 17 and 27. The resulting pulse trains 19 and 29 are applied to respective pulse-shaping circuits 18 and 28. These provide two control signals corresponding to the leading edge and the end of the pulses 19 and 29. The clipping level is controlled by an error signal provided by a comparator circuit 32 connected to compare the load voltage with a reference potential. The clipping is suitably carried out by superimposing the triangular waveform with a direct voltage whose amplitude is controlled by the comparator circuit 32.

While the invention has been particularly shown and described with reference to preferred embodiments thereof, it will be understood by those skilled in the art that various changes in form and details may be made therein without departing from the spirit and scope of the invention.

What I claim is:

1. An inverter comprising two pairs of controlled rectifiers connected in a bridge circuit, an input across a first diagonal of said bridge for connection to a direct current supply and an output across a second diagonal of said bridge for connection to an alternating current load, the controlled rectifiers of one pair having their anodes connected to a positive terminal of the input and the controlled rectifiers of the other pair having their cathodes connected to a negative terminal of the input, means for controlling the firing time of said rectifiers such that the rectifiers of a first pair are maintained continuously in conduction during all periods when no power is to be supplied to the output and one of the conducting rectifiers is extinguished and the rectifier of the second pair in series with it is fired during periods when power is supplied to the output, whereby the output voltage of the inverter is controlled by the firing times of the controlled rectifiers.

2. An inverter as claimed in claim 1, wherein the means for controlling the firing time of said rectifiers provides a first train of pulses at twice the inverter output frequency and a second train of pulses delayed with respect to the first train by an amount dependent on the alternating output voltage of the inverter, the pulses of the first train serving to extinguish one of the continuously conducting rectifiers of the first pair and to fire the rectifier of the second pair in series with it, and the pulses of the second train serving to reverse this action to refire the extinguished rectifier and extinguish the fired rectifier.

3. An inverter as claimed in claim 1, wherein the means for controlling the firing time of said rectifiers provides a first and second train of pulses having periods equal to that of the alternating inverter output voltage, the leading edge of each pulse extinguishing one of the continuously conducting rectifiers of the first pair and firing the rectifier of the second pair in series with it and the end of each pulse reversing that action refiring the extinguished rectifier and extinguishing the fired rectifier.

4. An inverter as claimed in claim 3, wherein the pulse trains are produced by superposing a triangular waveform voltage with a direct voltage, wherein the amplitude of said direct voltage depends on the alternating output voltage of the inverter.

5. An inverter as claimed in claim 1, further comprising a diode connected in parallel with each of said controlled rectifiers.

6. Apparatus as claimed in claim 1, further comprising a comparator means connected to sample the inverter output voltage, compare said voltage with a reference potential and to provide an output signal indicative of the inverter output voltage.

* * * * *